United States Patent
Ruesch et al.

(10) Patent No.: US 11,691,238 B2
(45) Date of Patent: Jul. 4, 2023

(54) DEVICE FOR MOVING AN ARRANGEMENT FOR CUTTING AND WELDING METAL STRIPS

(71) Applicant: CLECIM SAS, Savigneux (FR)

(72) Inventors: Jeremie Ruesch, St. Martin la Plaine (FR); Herve Thomasson, Seysuel (FR); Cedric Vercasson, Saint Chamond (FR)

(73) Assignee: Clecim SAS, Savigneux (FR)

( * ) Notice: Subject to any disclaimer, the term of this patent is extended or adjusted under 35 U.S.C. 154(b) by 55 days.

(21) Appl. No.: 17/108,171

(22) Filed: Dec. 1, 2020

(65) Prior Publication Data

US 2021/0078127 A1   Mar. 18, 2021

Related U.S. Application Data

(62) Division of application No. 14/902,636, filed as application No. PCT/EP2014/063419 on Jun. 25, 2014, now Pat. No. 11,014,213.

(30) Foreign Application Priority Data

Jul. 2, 2013 (EP) .................................... 13290154

(51) Int. Cl.
*B23K 26/00* (2014.01)
*B23K 37/00* (2006.01)
(Continued)

(52) U.S. Cl.
CPC ........ *B23Q 39/024* (2013.01); *B23K 26/0876* (2013.01); *B23K 26/26* (2013.01);
(Continued)

(58) Field of Classification Search
CPC ... B23K 28/02; B23K 37/0229; B23K 37/047
See application file for complete search history.

(56) References Cited

U.S. PATENT DOCUMENTS

| | | | | |
|---|---|---|---|---|
| 4,014,495 A | * | 3/1977 | Oda | B23K 9/032 901/6 |
| 4,090,898 A | * | 5/1978 | Tuskos | B29C 66/1224 156/368 |

(Continued)

FOREIGN PATENT DOCUMENTS

| | | |
|---|---|---|
| CN | 1074161 A | 7/1993 |
| CN | 1363418 A | 9/2002 |

(Continued)

OTHER PUBLICATIONS

DE-4222025—A computer english translation (Year: 1994).

*Primary Examiner* — Erin B Saad
(74) *Attorney, Agent, or Firm* — Laurence A. Greenberg; Werner H. Stemer; Ralph E. Locher

(57) ABSTRACT

A device for moving at least one cutting and welding arrangement able to cut, then weld a tail of a first metal strip to a head of a second metal strip, includes at least one first carriage holding at least one welding head. The first carriage is movable over a guide path following a first course across a transverse strip region. At least one second carriage is movable separately from the first carriage and holds a cutting head. The second carriage is movable on a guide path following a second course. The welding head is used exclusively for a welding mode, the second carriage is used exclusively for a cutting mode and the two carriages have parked positions on either side of the tail and head widths of the strips. A welding method which is associated with the device is also provided.

4 Claims, 4 Drawing Sheets

(51) Int. Cl.
    *B23Q 39/02*     (2006.01)
    *B23K 26/70*     (2014.01)
    *B23K 37/02*     (2006.01)
    *B23Q 1/01*     (2006.01)
    *B23K 26/08*     (2014.01)
    *B23K 26/26*     (2014.01)
    *B23K 26/38*     (2014.01)
    *B26F 3/00*     (2006.01)
    *B23K 101/16*     (2006.01)
    *B23K 101/18*     (2006.01)

(52) U.S. Cl.
    CPC ............ *B23K 26/38* (2013.01); *B23K 26/702* (2015.10); *B23K 37/0235* (2013.01); *B23Q 1/012* (2013.01); *B26F 3/004* (2013.01); *B23K 2101/16* (2018.08); *B23K 2101/18* (2018.08)

(56) References Cited

U.S. PATENT DOCUMENTS

| | | | | |
|---|---|---|---|---|
| 4,133,470 A | * | 1/1979 | Trail | B23K 37/053 228/49.1 |
| 4,229,642 A | * | 10/1980 | Sakurai | B23K 9/287 219/124.1 |
| 4,364,171 A | * | 12/1982 | Niemann | H02G 5/063 219/60 A |
| 4,493,963 A | * | 1/1985 | Arnoldy | C23C 6/00 219/76.1 |
| 4,577,796 A | * | 3/1986 | Powers | B23K 9/0253 228/8 |
| 4,659,903 A | * | 4/1987 | Berne | B23K 7/007 219/60 R |
| 4,682,002 A | * | 7/1987 | Delle Piane | B23K 26/244 219/121.64 |
| 5,000,366 A | * | 3/1991 | Beattie | B23K 37/0452 228/49.1 |
| 5,064,991 A | | 11/1991 | Alborante | B23K 26/10 219/121.63 |
| 5,574,348 A | * | 11/1996 | Ehlerding | B23K 37/0235 318/575 |
| 5,624,588 A | * | 4/1997 | Terawaki | B23K 9/1272 901/42 |
| 5,814,787 A | * | 9/1998 | Nishibayashi | B21B 15/0085 219/121.64 |
| 5,961,858 A | * | 10/1999 | Britnell | B23K 26/067 219/121.81 |
| 6,380,514 B1 | * | 4/2002 | Han | B23K 37/047 901/42 |
| 6,462,299 B1 | | 10/2002 | Takeda et al. | |
| 7,960,669 B2 | | 6/2011 | Yamaguchi et al. | |
| 8,089,024 B2 | * | 1/2012 | Forlong | B23K 7/06 219/121.48 |
| 8,263,898 B2 | | 9/2012 | Alber | |
| 8,445,811 B2 | | 5/2013 | Barjon et al. | |
| 8,569,651 B2 | * | 10/2013 | Lipnevicius | B23K 37/0538 219/86.25 |
| 9,731,376 B2 | * | 8/2017 | Walsh | B23K 26/0869 |
| 2001/0023861 A1 | * | 9/2001 | Karube | B23K 26/067 219/121.76 |
| 2007/0241083 A1 | * | 10/2007 | Yamaguchi | B23K 26/0876 219/121.59 |
| 2010/0140234 A1 | * | 6/2010 | Alber | B23K 26/0604 219/121.64 |
| 2010/0219165 A1 | | 9/2010 | Woltering et al. | |
| 2014/0033614 A1 | * | 2/2014 | Bartolomucci | B60J 10/88 49/506 |
| 2018/0028061 A1 | * | 2/2018 | Islam | A61B 1/00039 |
| 2018/0043469 A1 | * | 2/2018 | Bea | B23K 26/38 |

FOREIGN PATENT DOCUMENTS

| | | | |
|---|---|---|---|
| CN | 101001713 A | 7/2007 | |
| CN | 101557902 A | 10/2009 | |
| CN | 201735955 U | 2/2011 | |
| CN | 201769010 U | 3/2011 | |
| DE | 2118527 A1 | 11/1971 | |
| DE | 4222025 A1 | 1/1994 | ........... B23K 26/147 |
| DE | 102007023017 A1 | 11/2008 | |
| JP | S60257983 A | 12/1985 | |
| JP | S61199593 A | 9/1986 | |
| JP | 2001334302 A | 12/2001 | |
| JP | 4814792 B2 | 11/2011 | |
| KR | 1020070022342 A | 2/2007 | |
| RU | 2432243 C2 | 10/2011 | |
| SU | 716754 A1 | 2/1980 | |

\* cited by examiner

DEVICE FOR MOVING AN ARRANGEMENT FOR CUTTING AND WELDING METAL STRIPS

CROSS-REFERENCE TO RELATED APPLICATION

This is a divisional application of U.S. patent application Ser. No. 14/902,636, filed Jan. 4, 2016, which was a national stage application, under 35 U.S.C. § 371, of International application PCT/EP2014/063419, filed Jun. 25, 2014, which claims priority of EP 13290154.7, filed Jul. 2, 2013; the prior applications are incorporated by reference herein in their entirety.

BACKGROUND OF THE INVENTION

Field of the Invention

The present invention relates to a device for moving an arrangement for cutting and welding a tail of a first metal strip to a head of a second metal strip, as well as a method associated with said device.

In the domain of metallurgical processing of metal strips moving on a line comprising processing modules (mill, planer, furnaces, pickling, galvanizing, annealing, etc.), metal strips are ideally inserted from coils that are successively uncoiled in order to position same sequentially on said line. To achieve the continuous physical movement of the strips being processed, it is desirable to cut then weld a tail of a first uncoiled strip to a head of a second strip that has been at least partially uncoiled, said strip tail and strip head being brought to a welding installation, notably referred to as a welder, for this purpose. During the welding operation, during which the strip tail and strip head are necessarily immobilized by jaws for welding (after cutting), it is necessary to at least limit or not to slow down the speed of movement of the (welded) strip at the processes downstream of the welder. Furthermore, strip length accumulation means are installed downstream and potentially upstream of the welder in order to enable continuation of the treatment process or processes despite the stopping and/or slowing period at the welder on account of the accumulation and/or feed of the strip in the strip length accumulation means. These accumulation means should be minimized as they are costly and bulky. Specifically, a processing line for such strips must tend to enable the continuous movement of the strips from an uncoiler at the line input to a recoiler or stack of cut strip sections at the line output. It is therefore desirable to minimize the duration of each strip stoppage (at least of a tail and/or of a head) at a point of the line such as in the welder while reducing accumulation that is not productive inasmuch as it represents only costs corresponding to a drop in productivity on the line caused by a reduction in the average speed of movement of the strip in the processing line and an increase in the equipment used to mitigate the slowing of the strip in certain sections of the line, such as using strip accumulation means.

Furthermore, coil strips may have different metallurgical properties, thicknesses and widths when entering a welder, in particular if different types and formats are processed. There are currently two main types of welder, light and heavy welders, used to weld different widths and thicknesses of metal strips in consideration of the stresses exerted on the welded zone by actions induced by the processes downstream of the welder. In other words, for wider welding applications in each of the "light or heavy" domains, it is desirable to be able to extend the welding ranges to greater strip formats and types, or even the contrary. However, in the case of a welder designed for small-format strips, if it is desired to extend welding to a larger format (assuming that the widths, thicknesses and metallurgical characteristics of the strips do not exceed the capabilities of said welder), the welding time shall be increased at least in proportion to the increase in weld length related to the desired width. This slows the productivity of the processing line (downstream) and potentially requires additional accumulation means downstream. In addition to the fact that the non-productive time has a negative impact, it is also necessary to provide increased capacity storage accumulators designed for wider strip formats. Accordingly, it is evident that such downstream accumulation means (and upstream accumulation means, where applicable) will also necessarily be heavier and more costly than before for a welder to be adapted to weld larger strip formats.

BRIEF SUMMARY OF THE INVENTION

Primarily, the present invention is based on the prior art of a device for moving at least one cutting and welding arrangement able to cut then weld a tail of a first metal strip to a head of a second metal strip, said device comprising at least a first carriage holding at least one welding head, said first carriage being movable along a guide path following a first course across at least one transverse region (commonly referred to as the "width") of the strip. Furthermore, the device includes at least one second carriage movable separately from the first carriage holding a cutting head, said second carriage being movable on a guide path following a second course. Such a device is well illustrated and described in the publication DE102007023017A1 (see FIGS. 2a, 2b, 2c) showing such a two-carriage layout, the carriages each having heads that can be switched between cutting and welding modes. This type of switchable head, primarily supplied by at least one laser source, is currently the flexible operating method technique best suited to cutting and welding metal blanks of different shapes. However, these heads have the drawback of not providing the same cutting and welding performance levels as separate cutting and welding heads used exclusively for cutting or welding metal strips. This is all the more apparent since the strips to be cut and welded may have different formats, thicknesses and metallurgical, physical/mechanical characteristics and therefore present stringent requirements in terms of cutting and welding performance, which are difficult to achieve using universal cutting and welding head technology. Furthermore, the device described in DE102007023017A1 includes an intermediate step (FIG. 2b), between a cutting step (FIG. 2a) and a welding step (FIG. 2c), for adjusting at least one of the two carriages in relation to the other in order to move the longitudinally aligned cutting heads to be switched to welding mode to positions transversely aligned in relation to an initial strip movement direction. This intermediate step has two drawbacks: firstly, the time lost when changing the alignment of the heads and of the carriages, which necessarily reduces productivity or requires additional accumulation capacity, and secondly the high degree of alignment precision required for this dynamic carriage/head arrangement, which requires costly alignment means to achieve the required reliability and robustness. Such means for precisely aligning carriages and the heads of same advantageously enable the device according to DE102007023017A1 to be easily used to weld segments of two metal sheets using free-form welds, but the present invention relates to cutting and welding linear edges of strip tails and heads, i.e. simpler profiles.

Finally, the present invention is also intended to provide an alternative to a conventional technique referred to as "single carriage" fitted with welding and cutting heads, for example in the arrangement comprising a single carriage fitted with a pivoting arm with multiple switchable cutting/welding heads, as set out in the same publication DE102007023017A1 (FIGS. 1a, 1b, 1c) and in JP S60-257983. This type of structure also has drawbacks related to dual-function cutting and welding heads and an intermediate step (such as in FIG. 1b in DE102007023017A1) that takes up too much time in terms of cycle and precision, as described above.

It should also be noted that cutting and welding devices that require alignment and/or pivoting means supported by one or more support and guide elements require such elements to be complex and therefore bulky and/or heavy, all the more so since precision and reliability of such means are required for installations working around the clock. Such elements are most commonly large and C-shaped to enable the movement, beside the strip, of cutting, welding, burnishing, quality control and heating heads, etc., regardless of the presence of said strip.

Moreover, if other modules are required in addition to the device according to the invention, such as at least one of the following modules:
  weld quality control means,
  welded zone burnishing unit,
  means for annealing a zone to be welded and/or a welded zone,
  the device described above will be even larger and bulkier, and it would be extremely complicated or even impossible to incorporate such modules therein (for example burnishing means on carriages pivoting or executing non-linear cutting/welding profiles). Accordingly, known devices for moving at least one cutting and welding arrangement clearly lack modularity.
  One purpose of the present invention is to propose a device for moving at least one cutting and welding arrangement able to cut, then weld a tail of a first metal strip to a head of a second metal strip, said device addressing the known problems described in the prior art and above.
  In particular, the invention addresses problems with a view to proposing the following advantages:
  Reducing the means for accumulating the moving strip, increasing productivity, shortening the duration of a cutting and welding cycle,
  Simplifying the cutting and welding cycle,
  Using (separate) high-performance cutting and welding heads,
  Enhancing adaptation to different strip formats and properties,
  Improving the simplicity, modularity, integration and streamlining/compacting of bearing/carriage structures,
  Limiting the excessive mechanical structural tolerances required, in particular using a dynamic precision aspect for the movement and positioning of carriages and cutting/welding heads on variable cutting and welding courses, which may vary between tens of centimeters and several meters,
  Reliability and robustness of the repetitive functions required for welding the strips,
  Facilitating machine maintenance operations in particular on account of easy access to the different heads and modules.

In association with such a movement device, a method for cutting and then welding is also proposed, said method being in particular optimized in terms of the minimum stoppage time of strips in a welder, i.e. preventing the time lost outside a cutting step and a welding step of the strip tail and head, in particular using the movement device.

Such a movement device and a related welding method as described below are therefore proposed.

A set of sub-claims also sets out the advantages of the invention.

Primarily, on the basis of a device for moving at least one cutting and welding arrangement able to cut then weld a tail of a first metal strip to a head of a second metal strip, the invention proposes a device comprising a first carriage holding at least one welding head, said first carriage being movable along a guide path following a first course across one transverse region of the strip, determined as a function of a cutting and welding width of said strip tail and head. The device includes at least one second carriage movable separately from the first carriage holding a cutting head, said second carriage being movable on a guide path following a second course. Finally, the device according to the invention is characterized in that:
  the welding head is used exclusively for a welding mode for the tail and head of cut strips,
  the second carriage is used exclusively for a cutting mode, i.e. it only includes at least one cutting unit, ideally formed by two cutting heads respectively arranged on the tail and head edges of the two strips.

In other words, the first carriage does not perform a cutting function, since it only carries at least one welding head (i.e. cannot be switched to a cutting mode).

Since the first and second carriages are separately movable and have separate welding and cutting modes, the device according to the invention provides an excellent degree of modularity, enabling same to move successively and directly from a cutting mode to a welding mode. No intermediate step for repositioning at least one of the two carriages and/or the heads of same is required between the cutting and welding steps, unlike DE102007023017A1 (FIG. 1b) and JP S60-257983 (by pivoting the arm 15). It is therefore possible to advantageously limit the mechanical structural tolerances required in particular by means of a dynamic precision aspect for the movement and intrinsic positioning of the carriages and cutting/welding heads between the cutting and welding steps. Very precise mechanical structural tolerances are only required on the variable cutting and welding courses. Furthermore, the complex, bulky and costly means for intermediate translational or pivoting movement between said cutting and welding modes are thus eliminated. The device according to the invention is therefore also significantly streamlined and the supporting structure of same using a single guide path (ideally simply longilinear) for the two carriages can be smaller and less bulky than the structures described in the prior art.

Given that an intermediate step between the cutting and welding steps is performed by activations directly following movement of the two carriages of the device according to the invention, the duration of a cutting and welding cycle is minimized, which advantageously reduces the need for moving-strip accumulation means and increases productivity.

Preferably, in the device according to the invention, the two guide paths of the first and of the second carriages are at least parallel or identical if the positioning of the cutting or welding head on each of the carriages is predetermined before movement of the carriages is activated. Furthermore, simple lightweight means for finely adjusting the position of the welding head on the first carriage can be added to the first carriage.

According to one embodiment, preferred for its simplicity, in the device according to the invention, the second carriage has at least two cutting heads, ideally with a fixed gap in order to simultaneously and transversely cut the heads and tails of two strips to be butt-welded with a constant distance between two transverse cutting planes. Said distance is determined by a gap value (Ec) that is in particular dependent on the dimensions (which are known and therefore predefinable) of the clamping jaws and of the chassis of the first carriage and the dedicated head thereof.

Ideally, the guide parts of the first and of the second carriages have at least one simple longilinear guide parallel to the cutting planes of the strips to be cut and welded. The length of said guide is at least the sum of the length of the course of the cutting carriage and the usable length in parked position of the two carriages on either side of the largest-format strip tail and head. This guide may be provided in different ways, using at least one slide, at least one rail, or any other linear guide means for the carriages facing at least one of the common faces of the tail and head of the strips to be welded. The highly simplified structure of same keeps it smaller and less bulky than the guide devices known in the prior art, such as C-shaped supports or any other support strengthened to carry nested shifters/pivots.

Other advantages and embodiments of the device according to the invention, as well as an associated method, are advantageously possible and provided using the figures described:

Other features which are considered as characteristic for the invention are set forth in the appended claims.

Although the invention is illustrated and described herein as embodied in device for moving an arrangement for cutting and welding metal strips, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
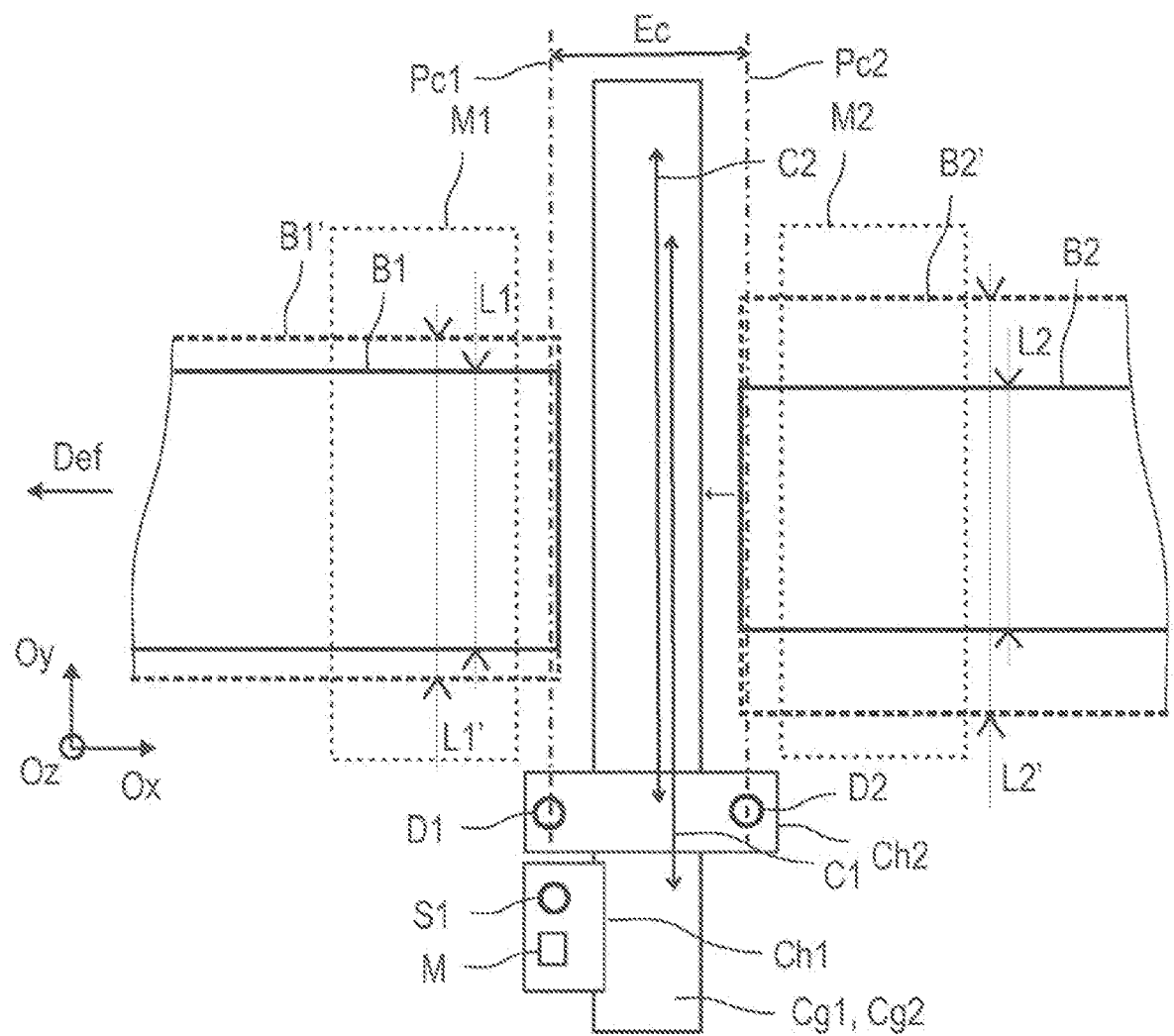
FIG. 1 Movement device according to the invention in pre-cutting position.

FIG. 1 is a top view of a set of metal strips (B1, B2, B1', B2') of different widths moving in a longitudinal direction (Def) (=direction inverse to the axis Ox) through a welder. Only two welder jaws (M1, M2) are shown for the sake of clarity in order to simply represent said welder, said jaws being used to block, in a clamped position, respectively that strip tail (B1, B1') and the strip head (B2, B2') and then to move the strip head (B2, B2') towards the strip tail (B1, B1'). The welder includes a device for moving at least one cutting and welding arrangement according to the invention. FIG. 1 shows said device in pre-cutting position.

Primarily, said device for moving at least one cutting and welding arrangement is able to cut, then weld a tail of a first metal strip (B1) to a head of a second metal strip (B2). The device includes a first carriage (Ch1) holding at least one welding head (S1), said first carriage (Ch1) being movable over a guide path (Cg1) following a first course (C1) across a transverse strip region. The length of the first course (C1) enables efficient welding on at least the shortest of the widths of the cut-strip tail and head. The device includes at least one second carriage (Ch2) movable separately from the first carriage holding a cutting head (D1), said second carriage (Ch2) being movable on a guide path (Cg2) following a second course (C2). The length of the second course (C2) enables efficient cutting on at least the largest of the widths of the tail and head of the strips to be cut.

Finally, the device according to the invention is characterized in that:
- the welding head (S1) is used exclusively for a welding mode,
- the second carriage (Ch2) is used exclusively for a cutting mode.

In the top view of the welder in FIG. 1, the two carriages are arranged on one side of the strip tail and head (B1, B2), i.e. in parked position before commencement of a cutting step using the second carriage (Ch2). The two guide paths (Cg1, Cg2) are at least parallel or identical, thereby inter alia making the device very simple, since all of the cutting and welding steps can firstly be carried out directly and successively. Secondly, the movement of the carriages caused by said device is exclusively and simply linear along the guide paths (Cg1, Cg2), the guide paths having at least one longilinear guide acting as bearing means.

Advantageously, in the device according to the invention, the second carriage (Ch2) has at least two cutting heads (D1, D2), ideally with a fixed gap (Ec) in order to simultaneously and transversely cut the heads and tails of two strips to be butt-welded with a constant distance between two transverse cutting planes (Pc1, Pc2). This distance is easily determined by a gap value (Ec) that is in particular dependent on the dimensions of the clamping jaws (opened in cutting position) and of the chassis of said carriage.

The first carriage (Ch1) has a least one of the following modules (M):
  weld quality control means,
  welded zone burnishing unit,
  means for annealing a zone to be welded and/or a welded zone.

In particular, the burnishing unit including a weld compression roller is also very easy to build into the first carriage, since the roller is arranged in an exclusively transverse plane (Oy, Oz) like the welding head (S1) and does not encroach on the limited space between the jaws, in particular when the clamping jaws are closed during the welding step. The same is true for integration on the first welding carriage of means for checking weld quality and/or means for annealing a zone to be welded and/or a welded zone (i.e. arranged upstream and/or downstream of the welding head).

Figure 2:
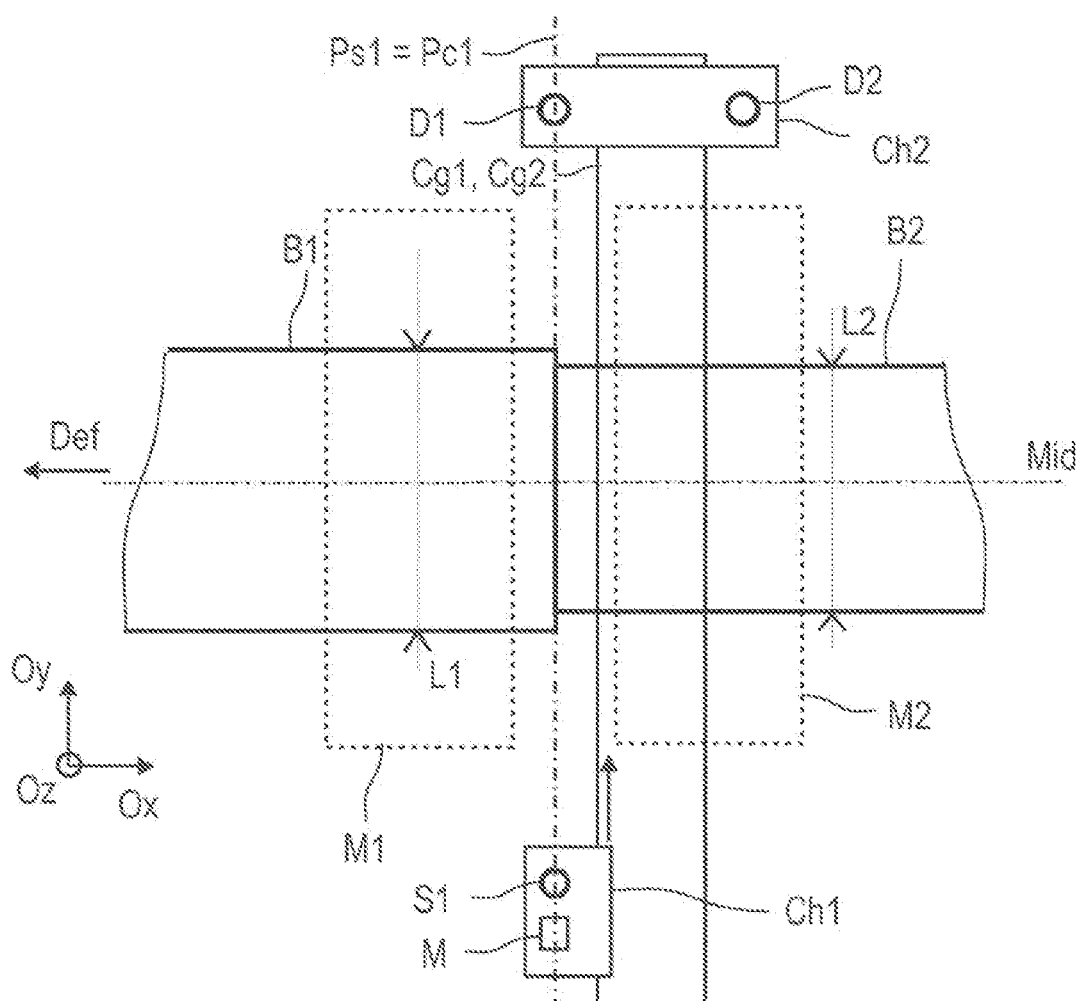
FIG. 2 Movement device according to the invention in the position corresponding to the end of the cutting step and in pre-welding position, FIG. 3 Movement device according to the invention provided with means for precisely/finely adjusting the position of the welding head, FIG. 4 Movement device according to the invention in the position corresponding to the end of the welding step, FIG. 5 Movement device according to the invention in pre-cutting position, viewed from the front in relation to a strip movement direction.

FIG. 2 shows the movement device according to the invention and FIG. 1, but in the position corresponding to the end of the cutting step and in the pre-welding position, i.e. at the end of the cutting step described in FIG. 1, once the second carriage (Ch2) has been moved in cutting mode for the strip tail and head (B1, B2) on the second course (C2). The first welding carriage (Ch1) is therefore still positioned in the initial parked zone on one side of the strips (B1, B2) and the second carriage (Ch2) is in the parked zone position on the other side of the strips (B1, B2). At this stage, at least one of the welder jaws (M2) clamped on the strip (B2) is moved towards the other jaw (M1) in the axial direction (Ox, Mid) in order to arrange the tail and head of the strips (making the cutting planes (Pc1, Pc2) match perfectly) opposite one another about a welding plane (Ps1), which in FIG. 2 is the same as the cutting plane (Pc1).

Figure 3:
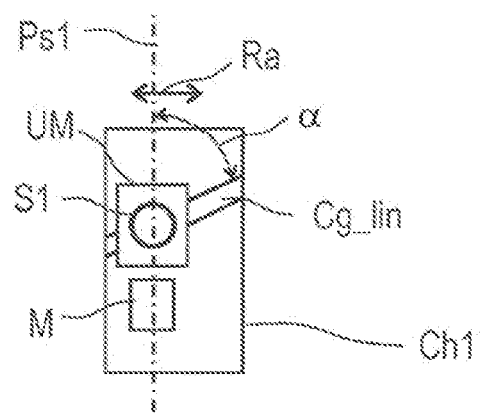

It is nonetheless possible, depending on the format, that the thickness, the physical properties of the strips to be welded, the welding method, and the cut tail and head edges of the strips may have more or less significant play, thereby requiring the welding plane to be substantially offset and adjusted axially (=longitudinally in the direction (Ox) in the direction of movement (Def) of the strips) from the initial completed cutting plane (Pc1) of the strip tail (B1). For this purpose, precise/fine adjustment means are proposed in FIG. 3, in which at least the welding head (S1) of the first carriage (Ch1) is installed on a mobile unit (UM) enabling an axial adjustment (Ra) of the position of said head (S1) in relation to the cutting and welding axes (Pc1, Ps1). More specifically and very simply, the mobile unit (UM) is arranged on a guide path rigidly connected to the first carriage (S1) as a linear guide path (Cg_lin) with an angle ($\alpha$) in relation to the cutting and welding axes (Pc1, Ps1) of for example~$1°<\alpha<90°$. Thus, for example, if the angle chosen is approximately 10°, a linear translational movement of 10 mm along the linear guide path (Ch_lin) will enable a finer actual axial offset of approximately 1 mm in the direction (Ox, Mid). As such, the linear translational movement does not require high-precision movement means (which are costly and possibly larger and heavier) since the precision required for "finer" axial adjustment is simply increased by reducing the angle ($\alpha$) if required. The linear translational movement along the linear guide path (Ch_lin) and/or a change of angle may be implemented manually or automatically using small, low-precision mechanisms depending on the types and formats of the strips being welded.

Figure 4:
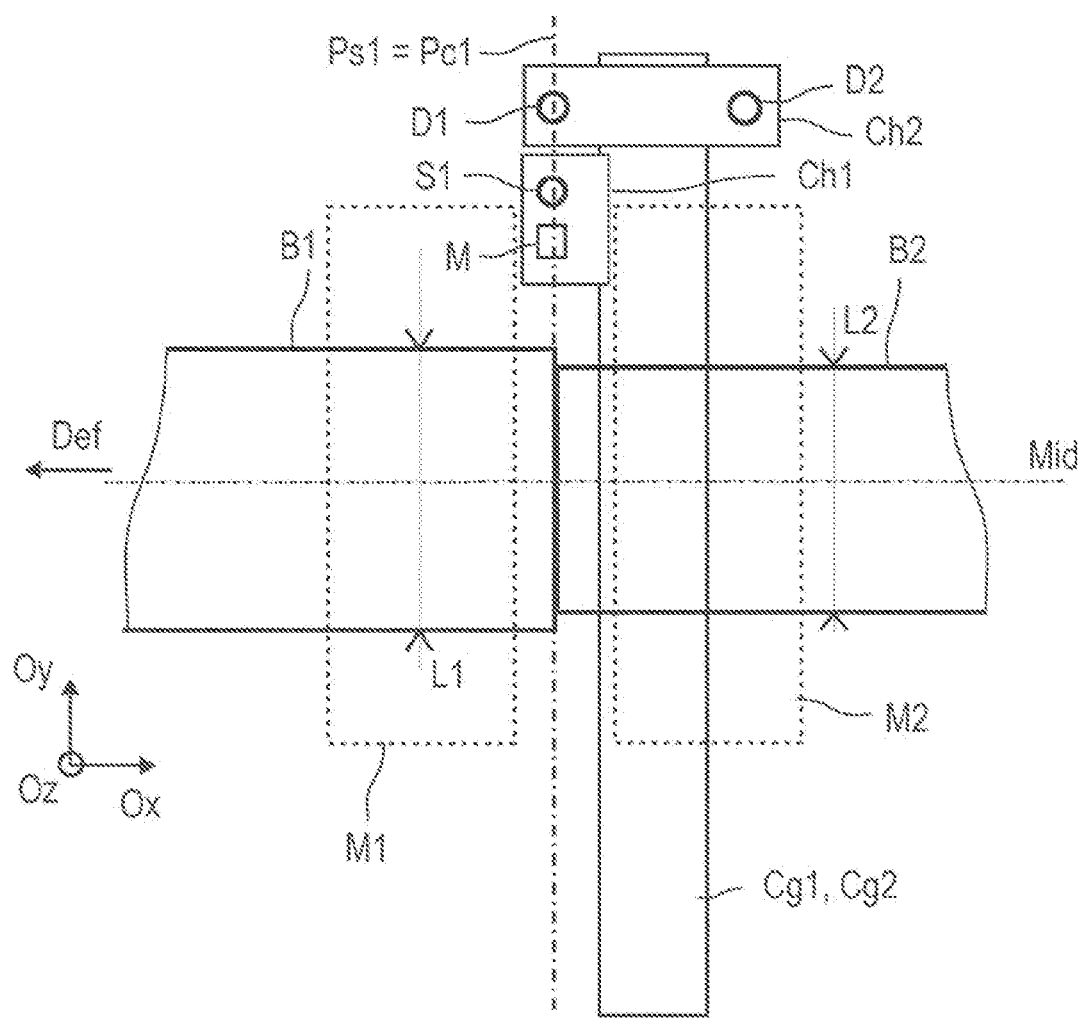

FIG. 4 shows the movement device according to the invention in the position corresponding to the end of the welding step along the first welding course (C1), the first and second carriages (Ch1, Ch2) being in parked zone position on the opposite side of the strips (B1, B2) initially defined in FIG. 1. The cutting and welding steps are then performed without an intermediate step for repositioning the carriages or heads.

Figure 5:
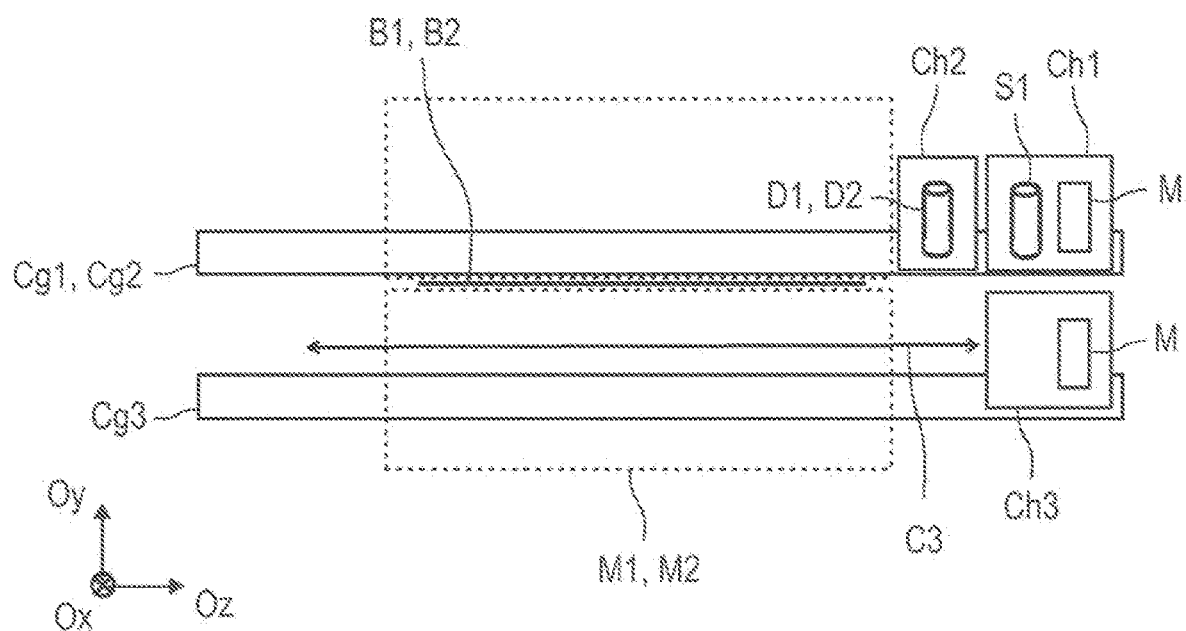

FIG. 5 shows the movement device according to the invention in pre-cutting position (see FIG. 1), viewed from the front (plane Oy, Oz) in relation to a strip movement direction (Ox). The device according to the invention has a third carriage (Ch3), moveable separately from the first and second carriages (Ch1, Ch2) and moveable on a guide path (Cg3) following a course (C3) at least parallel to the guide paths (Cg1, Cg2) and including at least one of the following modules (M):
   optionally at least one welding head,
   weld quality control means,
   a welded-zone burnishing unit,
   means for annealing a zone to be welded and/or a welded zone.

The first and third carriages (Ch1, Ch3) are arranged respectively on each side of the strip tail and head faces, and in particular each of said carriages is separately moveable on two parallel and separate guide paths (Cg1, Cg3). The courses of the first and third carriages (Ch1, Ch3) are parallel and the movement of same is at least synchronous in space and time during the welding, burnishing, quality control and annealing steps, in particular to enable burnishing of the upper and lower faces of a weld joint being effected on a given zone during movement of the two carriages to guarantee perfect bilateral point compression. To carry the third carriage (Ch3), a single longilinear guide comparable to the one provided for the first and second carriages (Ch1, Ch2) can be arranged beneath the clamping jaws, in this case in the lower part of the welder, if the longilinear guide of the first and second carriages (Ch1, Ch2) is arranged in the upper part of the welder in relation to the faces of the strips (B1, B2).

In general and for all of the examples shown in FIGS. 1 to 5, in the device according to the invention, the welding and/or cutting heads have a laser output suitable for welding metal strips, said output being in particular coupled to a fiber-optic or air waveguide enabling a coupling of the guide to the laser output in synchronous movement with at least one of the carriages related to one of said heads. In other words, the welding and/or cutting heads are coupled at the input of same to at least one laser source via demultiplication of the fiber-optic or air waveguides. This embodiment enables the laser sources to be positioned remotely from said device according to the invention so as not to overload the carriages and therefore to avoid the carriage-bearing and longilinear-guide means from becoming too large and too heavy.

Alternatively, the cutting heads can use a mechanical method, using plasma or a high-pressure fluid jet, to implement a cutting stage of the strip tail and head (B1, B2). In this case, as with laser cutting, the carriages only have to carry a minimum number of cutting elements, since all energy or mechanical feed modules for the cutting head are remotely positioned away from the second cutting carriage. Thus, the size and weight of the second cutting carriage is kept to a minimum, thereby advantageously reducing the size and weight of the device according to the invention.

Furthermore, in the device according to the invention, the first carriage (Ch1) holding at least the first welding head (S1) can also hold at least one additional welding head in at least one intermediate position in the transverse welding direction (Oy) on the first carriage that, when said carriage is moved such that the welding head (S1) on the end of the supporting element is opposite one of the faces of the strips (B1, B2) such as for example above the strips (B1, B2) at a distance of at least one half-width of the strips, the additional head is positioned on the edge of the variable width of the strip, i.e. the edge of the strip having the shortest width. As such, the welding width is segmented into at least two half-widths, which halves the duration of the original welding cycle using one welding head. It is also possible to add two, three, etc. additional welding heads to increase weld joint segmentation across the width of the strips to be welded. One or more additional welding head adjustment support units are then installed on the first carriage (Ch1) in order to carry and move said additional welding heads. The intermediate position of the additional welding head or heads on the first welding carriage can also be adjusted in the transverse direction (Oy) and as a function of the variable width (L1, L1'; L2, L2') of at least the strip having the shortest width, the position being adjusted in particular manually or autonomously, and ideally motorized. Thus, at least one additional welding head is installed on the first welding carriage (Ch1) by means of an adjustment support unit, said adjustment unit enabling a transverse positioning course of at least the additional welding head.

This advantageously reduces the duration of a welding step by a factor of at least two and potentially more if the number of additional heads is greater than two. Finally, each of the courses required to perform the welding (using fixed and additional heads) on the products to be welded are equally reduced by a factor of two or more, which enables high-precision guidance on a limited course with low mechanical structural tolerances, which advantageously minimizes implementation costs. This enables simplification of a head holding support design, i.e. avoiding any over dimensioning of said supporting element (and even enabling the dimensions to be reduced), dispensing with design properties of the supporting element used to ensure greater carrying accuracy, in particular on longer courses.

Finally, the invention incorporating the embodiments related to the movement device presented proposes a cutting and welding method able to weld a tail of a first metal strip to a head of a second metal strip, the two strips moving (Def) continuously on a metal processing line, in which the first and second strips are inserted into a welder including the movement device according to the invention and at least two pairs of clamping jaws for the tail and the head, and where at least the first and second, and potentially the third, carriages (Ch1, Ch2, Ch3) are placed in an intermediate parked position (=on either side of the strip widths) or moved along a single physical guide path (Cg1, Cg2) or on two guide paths (Cg1, Cg3) that are physically separate and parallel as a function of the sequencing cycle of the cutting, welding and potentially quality control, burnishing and annealing operations on the weld zone.

Said method according to the invention advantageously provides for the carriages (Ch1, Ch2, Ch3) to move as a function of the distance between the pairs of jaws according to at least two gap values for each pair of jaws (open for cutting and closed for welding). Inversely, the instantaneous position of each of the cutting and welding carriages (parked, beside the strips) provides information to a module for controlling the position of the jaws in order to seamlessly concatenate the cutting and welding steps.

By way of example for uncoiled metal strips having a width of approximately 2 m and a thickness of less than 10 mm, the welding method according to the invention enables activation of a first simultaneous cutting phase for the tail of the first metal strip and the head of a second metal strip for a first largest gap value (for example 450 mm) between each pair of jaws, carried out before a welding phase of the tail and head for a second smallest value (for example 6 mm) between each pair of jaws. The movement of the jaws from 450 mm to 6 mm is triggered once the second cutting carriage leaves its cutting zone for the parked position after cutting (FIG. 2).

The invention claimed is:

1. A cutting and welding method for welding a tail of a first metal coil strip to a head of a second metal coil strip, comprising:
providing a cutting head on a first carriage movable on a guide extending transversely across the first and second coil strips;
providing a welding head on a second carriage movable independently of the first carriage on the guide transversely across the first and second coil strips;
clamping the tail of the first coil strip and the head of the second coil strip in respective clamping jaws;
parking the first and second carriages side-by-side on the guide in a first parking position adjacent first lateral edges of the first and second coil strips, the first carriage and the cutting head thereof as well as the second carriage and the welding head thereof being completely beyond the first lateral edges of the first and second coil strips in the first parking position;
cutting the tail of the first coil strip and the head of the second coil strip and subsequently welding the tail of the first coil strip to the head of the second coil strip by sequentially moving the first and second carriages completely across the first and second coil strips and parking the first and second carriages side-by-side on the guide in a second parking position adjacent second lateral edges of the first and second coil strips, the first carriage and the cutting head thereof as well as the second carriage and the welding head thereof being completely beyond the second lateral edges of the first and second coil strips in the second parking position.

2. The method according to claim 1, further comprising uncoiling the second coil strip from an upstream uncoiler and moving the head of the second metal strip to the respective clamping jaw.

3. The method according to claim 1, further comprising coiling the first coil strip on a downstream recoiler.

4. A cutting and welding method for welding a tail of a first metal coil strip to a head of a second metal coil strip, comprising:
providing a cutting head on a first carriage movable on a guide extending transversely across the first and second coil strips;
providing a welding head on a second carriage movable independently of the first carriage on the guide transversely across the first and second coil strips;
clamping the tail of the first coil strip and the head of the second coil strip in respective clamping jaws;
parking the first and second carriages side-by-side on the guide in a first parking position adjacent and completely beyond first lateral edges of the first and second coil strips;
cutting the tail of the first coil strip and the head of the second coil strip and subsequently welding the tail of the first coil strip to the head of the second coil strip by sequentially moving the first and second carriages completely across the first and second coil strips and parking the first and second carriages side-by-side on the guide in a second parking position adjacent and completely beyond second lateral edges of the first and second coil strips;
providing the cutting head as two spaced apart cutting heads on the first carriage disposed in fixed positions at predetermined distance from one another in a longitudinal direction of the first and second coils strips and simultaneously cutting the tail of the first coil strip and the head of the second coil strip with respective ones of the two cutting heads.

\* \* \* \* \*